(12) United States Patent
Sauer et al.

(10) Patent No.: US 9,940,144 B2
(45) Date of Patent: Apr. 10, 2018

(54) STATE-SPECIFIC MOUSE-OVER GUIDANCE IN USER INTERFACES

(75) Inventors: Dietmar Michael Sauer, Hoechstaedt (DE); Ilona Eirich, Mannheim (DE)

(73) Assignee: SAP SE, Walldorf (DE)

( * ) Notice: Subject to any disclaimer, the term of this patent is extended or adjusted under 35 U.S.C. 154(b) by 883 days.

(21) Appl. No.: 13/615,023

(22) Filed: Sep. 13, 2012

(65) Prior Publication Data
US 2014/0075378 A1    Mar. 13, 2014

(51) Int. Cl.
G06F 3/048 (2013.01)
G06F 9/44 (2018.01)
G06F 3/0481 (2013.01)

(52) U.S. Cl.
CPC .......... *G06F 9/4446* (2013.01); *G06F 3/0481* (2013.01)

(58) Field of Classification Search
CPC .. G06F 9/4446; G06F 3/0481; G06F 3/04812; G06F 3/0484; G06F 3/04842
See application file for complete search history.

(56) References Cited

U.S. PATENT DOCUMENTS

| | | | |
|---|---|---|---|
| 2005/0125744 A1* | 6/2005 | Hubbard | G06F 3/0482 715/824 |
| 2007/0276875 A1* | 11/2007 | Brunswig | G06F 8/38 |
| 2008/0215976 A1* | 9/2008 | Bierner | G06Q 99/00 715/708 |
| 2008/0229197 A1* | 9/2008 | Branson | G06F 9/4446 715/705 |
| 2010/0185979 A1* | 7/2010 | Shores | G06F 3/0481 715/809 |
| 2010/0241516 A1* | 9/2010 | Kim | G06Q 30/0277 705/14.73 |
| 2013/0246470 A1* | 9/2013 | Price | G06F 21/6218 707/783 |

* cited by examiner

*Primary Examiner* — Andrey Belousov
*Assistant Examiner* — Seth A Silverman
(74) *Attorney, Agent, or Firm* — Mintz Levin Cohn Ferris Glovsky and Popeo, P.C.

(57) ABSTRACT

State-specific mouse-over guidance can be provided to a user of a user interface such that a field in the user interface can include more than one mouse-over guidance content item, and a specific mouse-over guidance content item provided to the user is determined based on a current state of the field and at least one underlying factors identified as resulting in the current state.

14 Claims, 5 Drawing Sheets

STATE-SPECIFIC MOUSE-OVER GUIDANCE IN USER INTERFACES

TECHNICAL FIELD

The subject matter described herein relates generally to providing user guidance in user interfaces and mote particularly to providing "mouse-over" guidance that is specific to a current state of the user interface.

BACKGROUND

The terms mouse-over, mouse hover, hover box, or the like generally refer to a graphical user interface feature in which guidance or other information is provided to a user when the user causes a cursor or pointer on a screen displaying a user interface (UI) to enter a trigger area on the screen. Current UI technology typically provides mouse-over guidance or mouse-over help (generally referred to herein as mouse-over guidance), which terms refer to an assistance information made available to a user when the user makes use of an input device to direct a pointer, cursor, or other icon on the screen (generally referred to herein as a pointer) on a screen displaying the UI to a certain position on the screen. In some examples, the mouse-over guidance is activated only if the user maintains the pointer at the certain position for more than a threshold amount of time. In the context of this application, an input device can include one or more of a mouse, a trackpad, a trackball, a touch sensitive screen, an optical pointer device, a keyboard, or any other device or approach that can be used to move a pointer on a screen between features (e.g. fields or other UI elements) of a UI.

SUMMARY

Using conventional approaches to mouse-over guidance, a user would likely be required to infer the cause for the field being locked or otherwise inactive for data entry. In contrast, implementations of the current subject matter provide a dynamically adaptable approach to mouse-over guidance that determines a current state of the field, identifies one or more underlying factors that have resulted in the current state of the field, accesses a metadata repository based on the identified underlying factors to retrieve one or more predetermined mouse-over guidance content items that relate to the one or more underlying factors, and returns a state-specific mouse-over guidance feature for display to a user when the user activates the mouse-over content by moving a pointer on a screen to a trigger point associated with the field.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
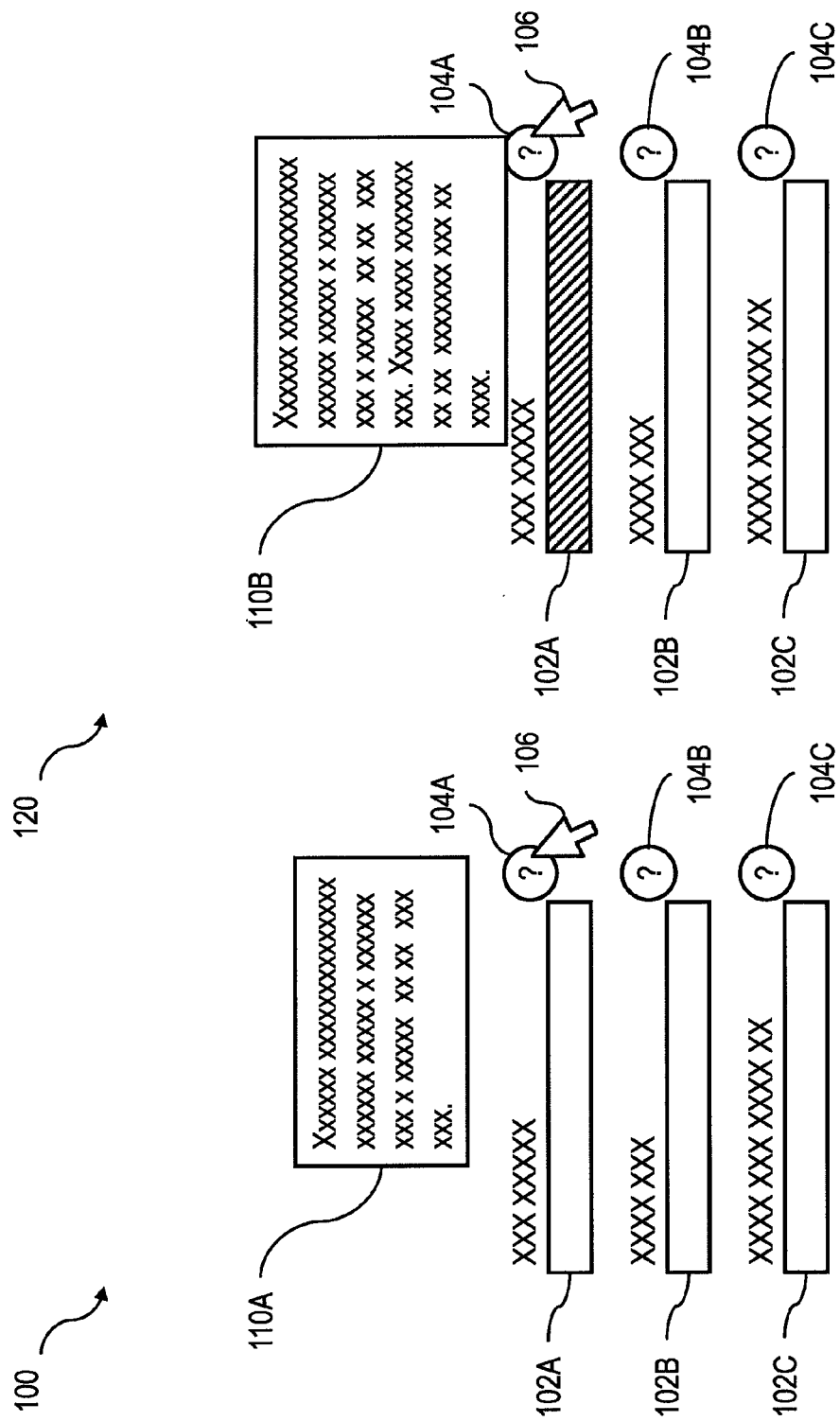
FIG. 1A and FIG. 1B are diagrams showing examples of a user interface view illustrating features of state-specific mouse-over guidance.

Mouse-over guidance can be provided in a variety of ways, including but not limited to text, images, sounds, a combination of such features, or the like. As noted above, mouse-over guidance can be provided in the form of text, images, sounds, or the like. For images or text, the mouse-over guidance can be presented in frame or other feature that appears to float or overlay on top of other, normally displayed UI elements. In other examples, an image or text feature of a mouse-over guidance need not overlay another UI element, but can instead appear in an unused or otherwise empty area of the UI that lacks other UI elements. An image that is part of a mouse-over guidance can be a single image, one or more images, a video segment, or the like. Audio guidance can be played through an appropriate audio device such as speakers, headphones, a headset, or the like. For convenience, at various parts of this disclosure, mouse-over guidance is discussed in terms of text displayed on a screen, for example in a hover box or the like displayed within the UI. However, it should be well understood that other forms of mouse-over guidance are also within the scope of the current subject matter.

A trigger area for causing mouse-over guidance to be provided to a user can be a screen feature or features that can include a field or other input element of the UI for which information is provided by the mouse-over guidance or, alternatively, a trigger feature that is associated with or otherwise located proximate to a field or other input element of the UI. Other input elements that can feature mouse-over guidance can include, but are not limited to a button, a pull-down menu, a radio button or click box, any other type of control, a group of any of such features, a tab, a designated area of a UI screen, or the like. A trigger feature can be an icon or other similar element of the UI that indicates to a user that it can be activated as a source of help or guidance.

For convenience, the term "field" is used herein to refer generically to any of an input field or other input element. Within a conventional user interface (UI), a field is typically in a specific state, such as for example an editable state, a read-only state, a locked state, or the like. However, mouse-over guidance associated with a given field is generally keyed to the input required in the field. For example, a mouse-over guidance for a field that requires date inputs might indicate to the user the proper format in which the date should be entered (e.g. "Please enter the starting date in the format DD/MM/YYYY"). Conventional mouse-over guidance generally lacks the information necessary to inform a user why the field with which it is associated is currently behaving in a certain way.

In a complex business software architecture, such as for example a enterprise resource planning (ERP) system, one or more underlying factors can influence the current state of a specific field in a UI. Underlying factors that can influence the current state of a field in a UI can include, but are not limited to a condition, an effect, a state, a status, or the like (generally referred to herein as a condition) of either the user interface itself, one or more databases or database management programs storing or handling data used in or accessible by the user interface in general or the field specifically, one or more data types within the database or database management program, a business object or other type of data object underlying the UI or the field, or the like (generally referred to herein as a database structure). Consistent with implementations of the current subject matter, mouse-over guidance in a UI can provide information to a user that is relevant to explaining why a given field is in an specific state and, optionally, one or more actions or conditions necessary to move the field into a different state.

FIG. 1A and FIG. 1B show example views 100, 120 of a user interface illustrating features relevant to the ensuing discussion of implementations of the current subject matter. In general, a UI can include fields 102A, 102B, 102C, trigger areas 104A, 104B, 104C (which can in some examples be the fields 102 themselves), and mouse-over guidance frames 110. In the example of FIG. 1A and FIG. 1B, three fields 102A, 102B, 102C are shown. In this example, each of the fields 102A, 102B, 102C includes a trigger area 104A, 104B, 104C that includes a question mark in a circle and that is located proximate to its respective associated field 102A, 102B, 102C. Any text or image can be used as a trigger area 104A, 104B, 104C, and some implementations of a UI may not have triggers areas 104A, 104B, 104C that are separate from the fields. Rather, the area of the field 102A, 102B, 102C itself can server as the trigger area 104A, 104B, 104C.

Further with reference to FIG. 1A, when a user moves a pointer 106 over the trigger area 104A associated with the field 102A, a first mouse-over guidance 110A can be displayed. FIG. 1B shows the same UI at a different time. At the time depicted in FIG. 1B, the field 102A is now unavailable for user input, as indicated by some visual or functional feature, for example text within the field 102A stating that it is locked, inability to activate the field 102A by clicking on it, a change in color of the field 102A, or the like. Upon the user moving the pointer over the trigger area 104A, a different second mouse-over guidance 110B can be provided. This second mouse-over guidance 110B can optionally include some information in common with the first mouse-over guidance 110A. For example the first mouse-over guidance 110A and the second mouse-over guidance 110B can both include information regarding a purpose or operation of the field 102A (for example the type of data to be entered, why these data are required here, etc.). However, the second mouse-over guidance 110B can further augment the information regarding the purpose or operation of the field 102A with additional information pertaining to a current state of the field. For example, the additional information can include an explanation of why the field 102A is locked to receiving input, what actions or conditions need to occur to unlock the field 102A, or the like.

A field can be locked or unlocked or experience some other current state due to one or more of a variety of underlying factors, which can include without limitation a condition of a database structure associated with the field as noted above. In some implementations of the current subject matter, the condition of the associated database structure can impose a pre-requirement for the field to be active. As an example, for a UI dealing with time sensitive data, such as for example financial data or the like, a time period during which the data included in one or more fields of the UI can be changed, deleted, altered, or otherwise affected by a currently logged in user can have already expired or not yet been initiated. This situation can occur frequently, for example in UIs relating to entry of time worked, recording of expenses incurred, preparing and sending of invoices, and the like.

A state-specific mouse-over guidance capability can be supported by a metadata infrastructure within a business software architecture that includes a plurality of mouse-over guidance content items for a field in a UI. The number of mouse-over help content items included within the metadata infrastructure for a field can depend on the number of potential states for the field as well as on the number of potential underlying factors (e.g. conditions of database structures) that can result in a current state of the field.

In some implementations of the current subject matter, an algorithm can be applied to determine the content items to include within a mouse-over guidance provided for a field. In general terms, the overall content provided for a given state, C(State), of the UI, of a business object underlying the UI, of a field within the UI, or the like can be a combination of at least one general content item, $I_G$, and at least one state specific content item, I(State), that is determined as a function of the current state:

$$C(\text{State}) = I_G + I(\text{State}) \qquad (1)$$

One or more state specific content items can be stored for a field in a metadata repository as is discussed in greater detail below with reference to illustrative examples of business software architectures.

If the state of a field can be derived from the state of another field the state specific mouse over text can also be derived (e.g. if a whole area with several fields is read-only, the explanation why the area is read only can only be stored at the area and be derived from all the fields within that area).

Implementations of the current subject matter can, among other possible advantages, provide state-specific mouse-over help that is dynamically tailored according to a current state of a single field in a UI, a group of fields in a UI, an area of the UI that included one or more fields, the entire UI, or the like. Such a capability can significantly improve the usability of a UI. Using state-specific mouse-over help in a manner consistent with the described subject matter can allow the current state of a field to be explained and action that have to be done by the user so that the user can switch to another state can be described. A number or frequency of internal or customer service request tickets concerning questions relating to why a field of a UI is currently behaving in a manner that the user does not understand can be reduced. Rather than needing to a call a help desk or other information technology support professional or other expert, a user can more readily comprehend the underlying factors affecting or otherwise causing the current state of a field in a user interface. Additionally, by only providing the mouse-over guidance content items that are relevant to a current state of the field, the amount of information conveyed to a user via the state-specific mouse-over guidance content can be reduced, thereby increasing user productivity. A user need not process multiple explanations that may not be applicable to the current state of the field but can instead be presented with a mouse-over guidance that is specifically tailored to hat is actually, currently occurring to affect the current state of the field.

Figure 2:
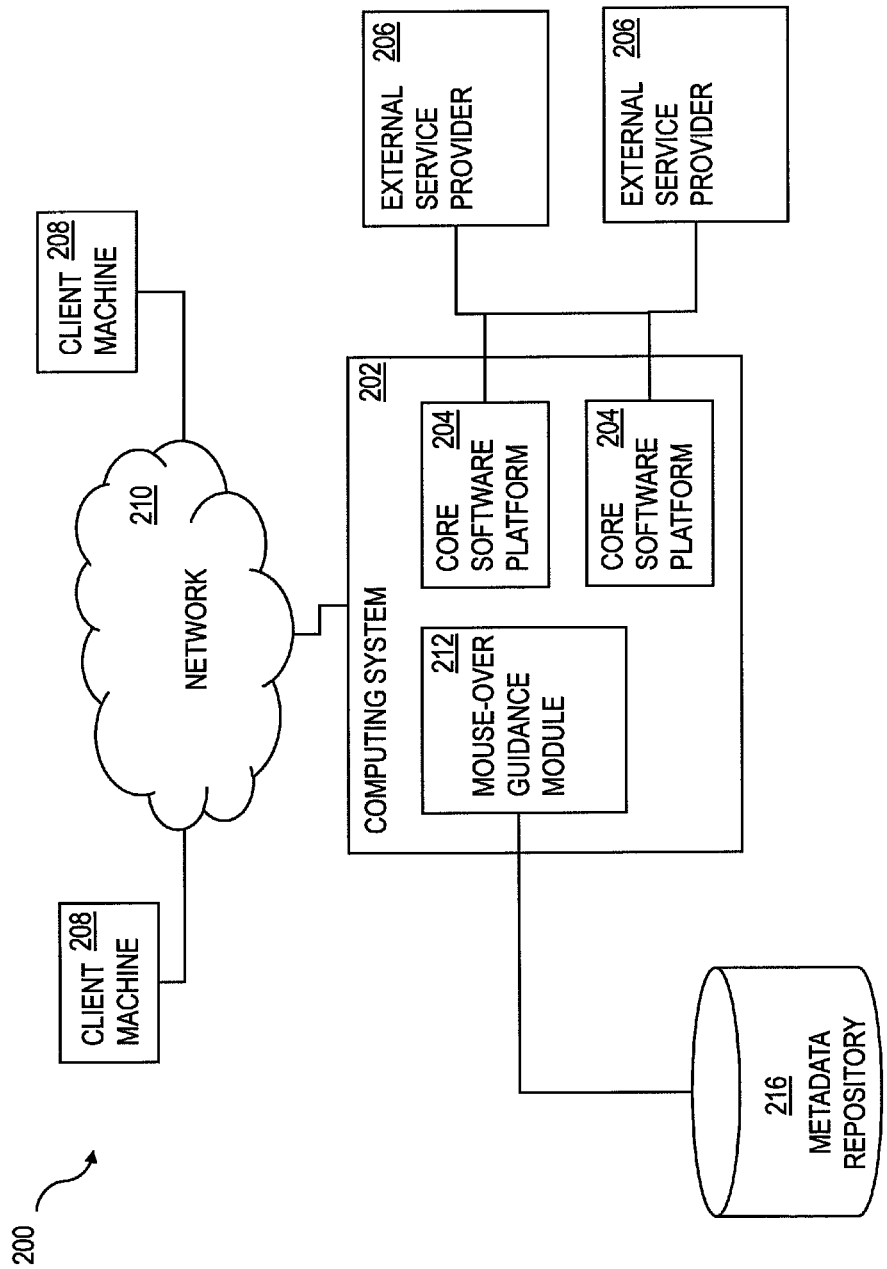
FIG. 2 is a diagram illustrating aspects of an example of a software architecture showing features consistent with implementations of the current subject matter.

The core software platform of an enterprise resource planning (ERP) system, other business software architecture, or other database functionality can in some implementations be provided as a standalone, customized software installation that runs on one or more processors that are under the control of the organization. This arrangement can be very effective for a large-scale organization that has very sophisticated in-house information technology (IT) staff and for whom a sizable capital investment in computing hardware and consulting services required to customize a commercially available business software solution to work with organization-specific business processes and functions is feasible. FIG. 2 shows a diagram of a system consistent with such an implementation. A computing system 202 can include one or more core software platform modules 204 providing one or more features of the business software system. In some implementations, the computing system 202 can be an application server. The computing system 202 can also aggregate or otherwise provide a gateway via which users can access functionality provided by one or more external service providers 206. Examples of external service providers 206 can include one or more computing systems supporting database functionality or other software functionality created or provided from a partner or other third party software developer. This external service provider database functionality or other software functionality can be provided over either direct or networked connections if the one or more external provider computing systems are separate from the computing system 202 that includes one or more core software platform modules 204. Alternatively, the external service provider database functionality or other software functionality can be hosted on the computing system 202 that includes the one or more core software platform modules 204.

Client machines 208 can access the computing system, either via a direct connection, a local terminal, or over a network 210 (e.g. a local area network, a wide area network, a wireless network, the Internet, or the like). A mouse-over guidance module 212 or multiple such modules can execute on the computing system 202, on one or more separate systems, or any combination thereof to perform one or more of the mouse-over guidance operations discussed in greater detail elsewhere herein. For the remainder of this disclosure, the mouse-over guidance module 212 will be discussed in the singular. However, it will be readily understood that one or more features of the methods, techniques, approaches, etc. relating to functionality ascribed to a single mouse-over guidance module 212 can be performed by multiple modules, which can be implemented within a single system that includes one or more processors or on multiple systems that each include one or more processors. The mouse-over guidance module 212 can access one or more metadata repositories 216 (referred to generally herein in the singular as a metadata repository 216), which can retain one or more of metadata for use by at least one of the one or more core software platform modules 204 and the database functionality or other software functionality provided by one or more external service providers 206. The one metadata repository 216 can also retain metadata mapping underlying factors that can affect the state of a field in a user interface to the actual states of that field that are experienced by a user. The metadata repository 216 can also store objects or other elements, such as for example business objects, metadata objects, or the like. These objects or other elements can include definitions of business scenarios, business processes, and one or more business configurations as well as data, metadata, master data, etc. relating to definitions of the business scenarios, business processes, and one or more business configurations, and/or concrete instances of the data objects (e.g. business objects) that are relevant to a specific instance of the business scenario or a business process. In some implementations, a business object or other metadata object can include a template definition of a standard business process or other related functionality. The template definition can optionally be modified via one or more extensions that can also be stored in the one or more repositories 216. The one or more repositories can also include storage for data relating to the business or other aspects of the organization.

Smaller organizations can also benefit from use of business software functionality. However, such an organization may lack the necessary hardware resources, IT support, and/or consulting budget necessary to make use of a stand-alone business software architecture product and can in some cases be more effectively served by a software as a service (SaaS) arrangement in which the business software system architecture is hosted on computing hardware such as servers and data repositories that are maintained remotely from the organization's location and accessed by authorized users at the organization via a thin client, such as for example a web browser, over a network.

In a software delivery configuration in which services of an business software system are provided to each of multiple organizations are hosted on a dedicated system that is accessible only to that organization, the software installation at the dedicated system can be customized and configured in a manner similar to the above-described example of a standalone, customized software installation running locally on the organization's hardware. However, to make more efficient use of computing resources of the SaaS provider and to provide important performance redundancies and better reliability, it can be advantageous to host multiple tenants on a single system that includes multiple servers and that maintains data for all of the multiple tenants in a secure manner while also providing customized solutions that are tailored to each tenant's business processes.

Figure 3:
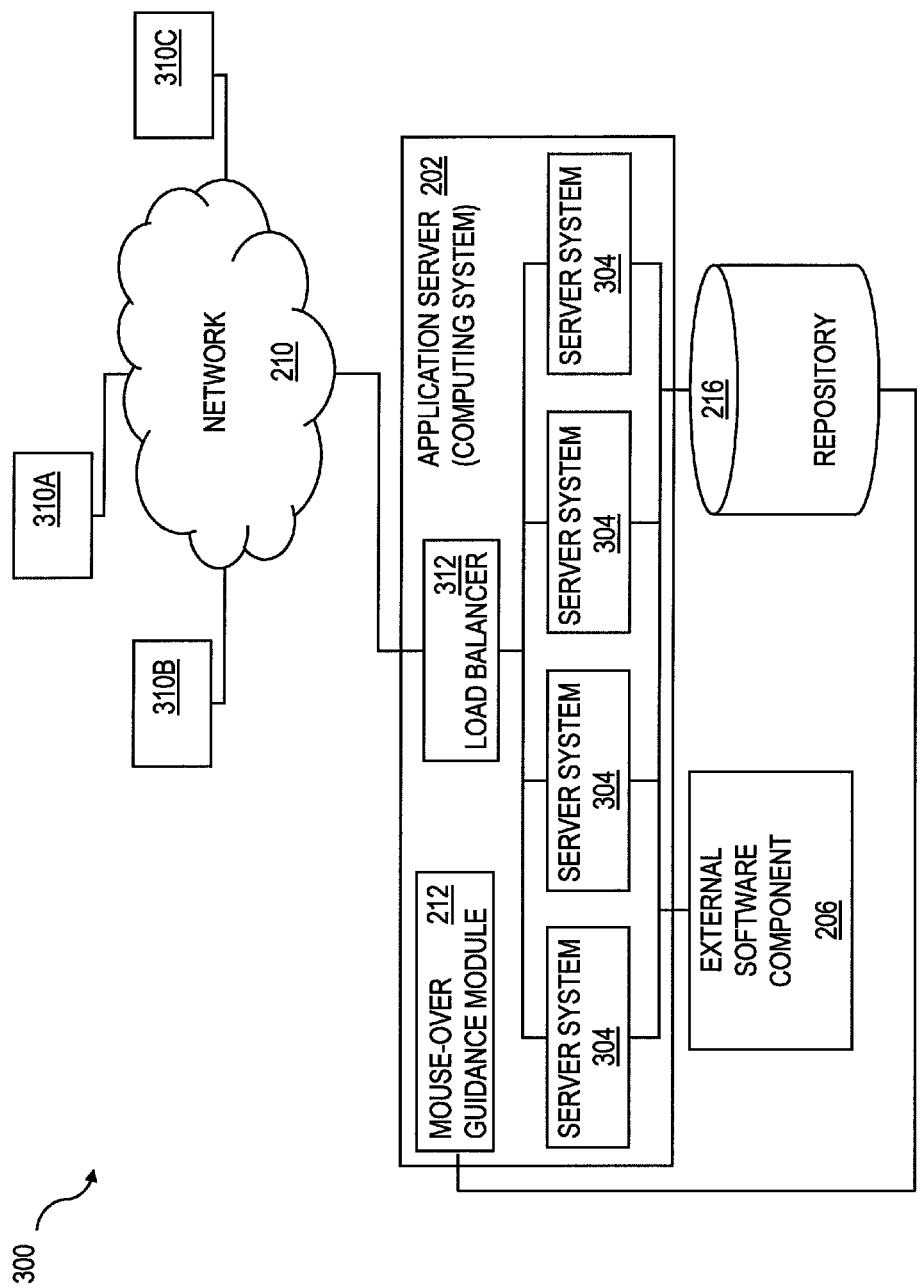
FIG. 3 is a diagram illustrating aspects of another example of a software architecture showing features consistent with implementations of the current subject matter.

FIG. 3 shows a block diagram of a multi-tenant implementation of a software delivery architecture 300 that includes an application server 202, which can in some implementations include multiple server systems 304 that are accessible over a network 210 from client machines operated by users at each of multiple organizations 310A-310C (referred to herein as "tenants" of a multi-tenant system) supported by a single software delivery architecture 300. For a system in which the application server 302 includes multiple server systems 304, the application server can include a load balancer 312 to distribute requests and actions from users at the one or more organizations 310A-310C to the one or more server systems 304. Instances of the core software platform 204 (not shown in FIG. 3) can be executed in a distributed manner across the server systems 304. A user can access the software delivery architecture across the network using a thin client, such as for example a web browser or the like, or other portal software running on a client machine. The application server 302 can access data and data objects stored in one or more metadata repositories 216 which can make one or more of metadata and other data available for use by at least one of the one or more core software platform modules 204 and the database functionality or other software functionality provided by one or more external service providers 206. The application server 302 can also serve as a middleware component via which access is provided to one or more external software components 206 that can be provided by third party developers.

As in the standalone system 200 of FIG. 2, a mouse-over guidance module 212 or multiple such modules can execute on the computing system 202, on one or more separate systems, or any combination thereof to perform as discussed elsewhere herein. The mouse-over guidance module 212 can access a metadata repository 216, which, as noted above, can be part of or directly accessible to the application server 302, or, alternatively or in addition, can be located remotely or optionally spread over one or more physical or virtual servers, for example as in a cloud computing arrangement. The mouse-over guidance module or modules 212 can execute on the application server 302, on one or more separate application servers, or any combination thereof to perform one or more of the project assembly operations discussed in greater detail below. The metadata repository 216 can store pre-determined mouse-guidance content items relating to specific fields and to underlying factors that affect those fields, such as conditions of database structures.

A multi-tenant system such as that described herein can include one or more of support for multiple versions of the core software and backwards compatibility with older versions, stateless operation in which no user data or business data are retained at the thin client, and no need for tenant configuration on the central system. As noted above, in some implementations, support for multiple tenants can be provided using an application server 302 that includes multiple server systems 304 that handle processing loads distributed by a load balancer 312. Potential benefits from such an arrangement can include, but are not limited to, high and reliably continuous application server availability and minimization of unplanned downtime, phased updating of the multiple server systems 304 to permit continuous availability (one server system 304 can be taken offline while the other systems continue to provide services via the load balancer 312), scalability via addition or removal of a server system 304 that is accessed via the load balancer 312, and de-coupled life cycle events or processes (such as for example system maintenance, software upgrades, etc.) that enable updating of the core software independently of tenant-specific customizations implemented by individual tenants.

As in the example illustrated in FIG. 2, the repository 216 can store a business object that represents a template definition of a standard business process. Each individual tenant 310A-310C can customize that standard template according to the individual business process features specific to business of the organization to which that tenant is assigned. Customizations can be stored as extensions in the metadata repository.

Figure 4:
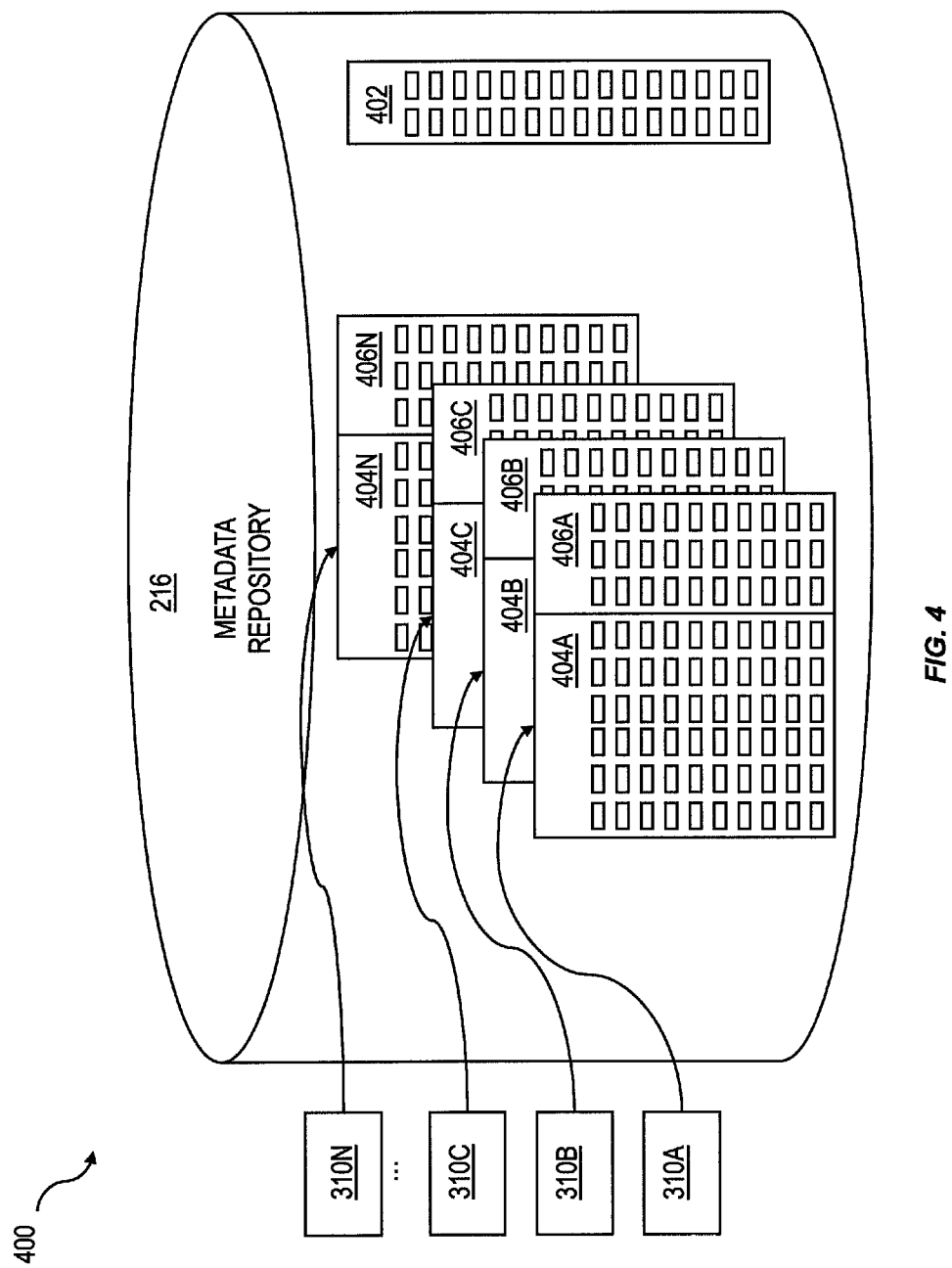
FIG. 4 is a diagram illustrating aspects of a repository showing features consistent with implementations of the current subject matter.

To provide for customization of the business process for each of multiple organizations supported by a single software delivery architecture 300, the data and data objects stored in the metadata repository 216 and/or other data repositories that are accessed by the application server 302 can include three types of content as shown in FIG. 4: core software platform content 402 (e.g. a standard definition of a business process), system content 404, and tenant content 406. Core software platform content 402 includes content that represents core functionality and is not modifiable by a tenant. System content 404 can in some examples be created by the runtime of the core software platform and can include core data objects that store concrete data associated with specific instances of a given business process and that are modifiable with data provided by each tenant. Metadata relating to one or more of core software platform content 402, system content 404, and content provided by the one or more external service providers 206 can optionally be part of a system tenant that is accessible from all other tenants 310A-310N.

The data and/or the metadata retained in the tenant content 406 can be tenant-specific: for example, each tenant 310A-310N can store information about its own inventory, sales orders, etc. as well as metadata pertaining to extensions, processes, or the like that are specific to the organization assigned to that tenant. Tenant content 406A-406N can therefore include data objects or extensions to other data objects that are customized for one specific tenant 310A-310N to reflect business processes and data that are specific to that specific tenant and are accessible only to authorized users at the corresponding tenant. Such data objects can include a key field (for example "client" in the case of inventory tracking) as well as one or more of master data, business configuration information, transaction data or the like. For example, tenant content 406 can reflect tenant-specific modifications or changes to a standard template definition of a business process as well as tenant-specific customizations of the business objects that relate to individual process step (e.g. records in generated condition tables, access sequences, price calculation results, other tenant-specific values, or the like). A combination of the software platform content 402 and system content 404 and tenant content 406 of a specific tenant are accessed to provide the business process definition and/or the status information relating to a specific instance of the business process according to customizations and business data of that tenant such that each tenant is provided access to a customized solution whose data are available only to users from that tenant.

A mouse-over guidance module or modules 212 or other computer-implemented functionality having one or more similar features can handle accessing of the appropriate mouse-over guidance content items from a metadata repository 216 associated with the software architecture and accessible from the computing system or application server 202. The metadata repository 216 can include pre-determined mouse-over guidance items that apply to fields related to business objects supporting the core software platform 204, which can be stored as part of software platform content 402 and/or system content 404, and also to fields related to extension fields or other functionality added either by external service providers 206 or by user customizations stored as part of tenant content 406.

Figure 5:
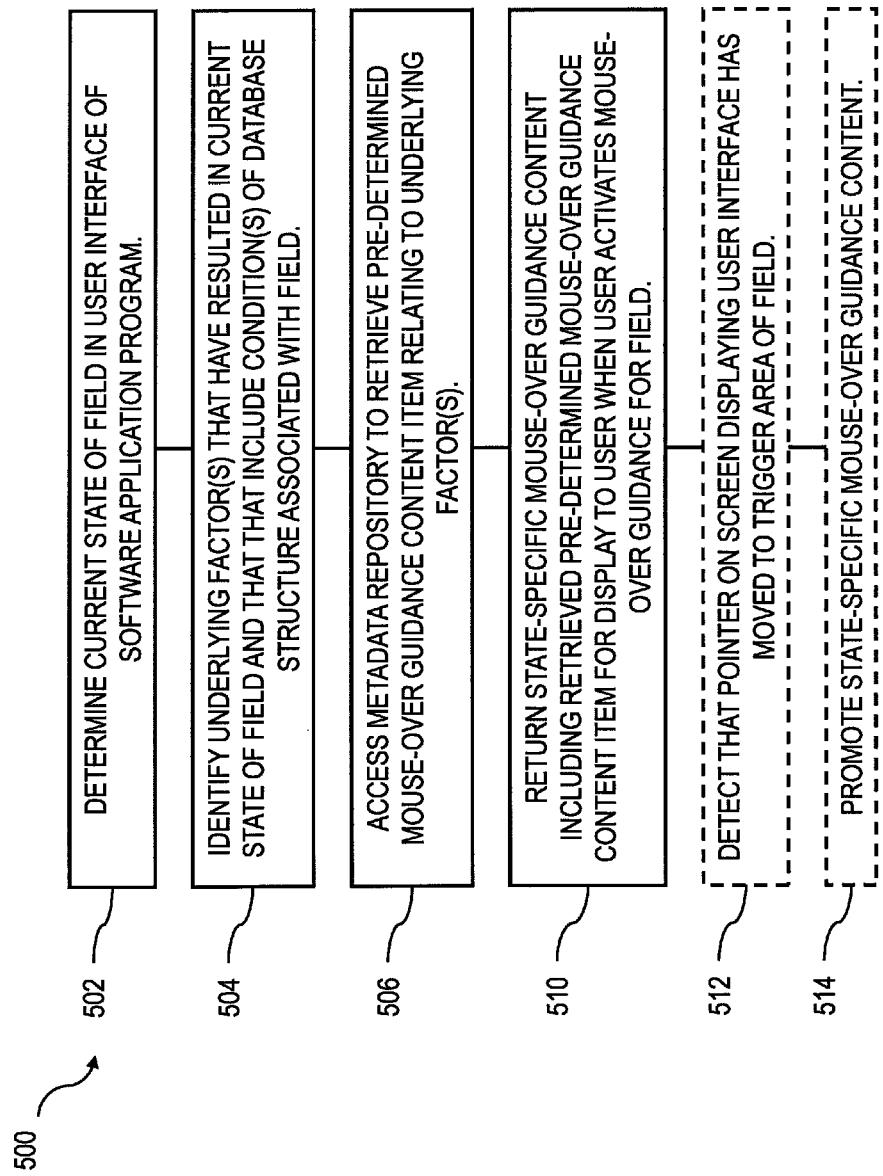
FIG. 5 is a process flow diagram illustrating aspects of a method having one or more features consistent with implementations of the current subject matter.

FIG. 5 shows a process flow chart 500 illustrating method features, one or more of which can be included in an implementation of the current subject matter. At 502, a current state of a field in a user interface in a user interface of a software application program is determined. The determining can optionally occur dynamically at run time upon a detection that a pointer on a screen displaying the UI has moved to a trigger area associated with the field. As noted above, the trigger area can be an area of the field itself or, optionally, an area outside of the field, for example an icon or text indicating to a user that mouse-over guidance is available by hovering the pointer over it. The current state can include at least one of an editable state, a read-only state, and a locked state.

At 504, at least one underlying factor that caused the current state of the field is identified. The at least one underlying factor can include a condition of a database structure associated with the field. At 506, a metadata repository can be accessed based on the identified at least one underlying factor. The accessing can include retrieving at least one pre-determined mouse-over guidance content item relating to the one or more underlying factors. At 510, a state-specific mouse-over guidance content is returned for display to a user when the user activates a mouse-over guidance for the field by moving a pointer on a screen to a trigger point associated with the field. The state-specific mouse-over guidance content can include the retrieved at least one pre-determined mouse-over guidance content item and can optionally include a default mouse-over guidance content item for the field.

At 512, a detection that the pointer on the screen displaying the user interface has moved to the trigger area of the field can be made, and the state-specific mouse-over guidance can therefore optionally be promoted at 514. Promoting of a mouse-over guidance can optionally include one or more of displaying the state-specific One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed:

1. A computer program product comprising a non-transitory machine-readable medium storing instructions that, when executed by at least one programmable processor, cause the at least one programmable processor to perform operations comprising:

determining a current state of a field in a user interface of a software application program, the current state comprising at least one of an editable state, a read-only state, and a locked state of the field in the user interface;

identifying a factor causing the current state of the field, wherein the factor comprises a condition associated with a database structure, the condition being based on a time period during which data can be added, changed, deleted, and/or altered by a logged-in user;

retrieving, from a metadata repository and in response to determining the current state of the field is the editable state, a first content item;

retrieving, from the metadata repository and in response to determining the current state of the field is the read-only state or the locked state, the first content item and a second content item;

detecting whether a pointer has entered a trigger area associated with the field, the trigger area separate from the field;

displaying, when the current state is the editable state and in response to detecting that the pointer entered the trigger area, the first content item, wherein the first content item includes a text explanation of data which may be entered into the field;

displaying, when the current state is the read-only state or the locked state and in response to detecting that the pointer entered the trigger area, the first content item and the second content item, wherein the second content item includes an explanation of the current state of the field being in the read-only state or the locked state and an action to be completed by the user for switching the current state of the field to the editable state, the second content item determined based on the factor causing the current state of the field; and switching, in response to detecting completion of the action, the current state from the read-only state or the locked state to the editable state.

2. A computer program product as in claim 1, wherein the determining the current state occurs dynamically at run time upon the detecting that the pointer entered the trigger area.

3. A computer program product as in claim 1, wherein the text explanation is based on stored state-specific mouse-over guidance content including a default mouse-over guidance content item for the field.

4. A computer program product as in claim 1, wherein the database structure associated with the field comprises a business object, and wherein the first content item applies to an extension field added to the business object.

5. A computer program product as in claim 1, wherein the first content is dynamically tailored according to a group of fields in the user interface.

6. A system comprising:
    at least one programmable processor; and
    a machine-readable medium storing instructions that, when executed by the at least one programmable processor, cause the at least one programmable processor to perform operations comprising:

determining a current state of a field in a user interface of a software application program, the current state comprising at least one of an editable state, a read-only state, and a locked state of the field in the user interface;

identifying a factor causing the current state of the field, wherein the factor comprises a condition associated with a database structure, the condition being based on a time period during which data can be added, changed, deleted, and/or altered by a logged-in user;

retrieving, from a metadata repository and in response to determining the current state of the field is the editable state, a first content item;

retrieving, from the metadata repository and in response to determining the current state of the field is the read-only state or the locked state, the first content item and a second content item;

detecting whether a pointer has entered a trigger area associated with the field, the trigger area separate from the field;

displaying, when the current state is the editable state and in response to detecting that the pointer entered the trigger area, the first content item, wherein the first content item includes a text explanation of data which may be entered into the field;

displaying, when the current state is the read-only state or the locked state and in response to detecting that the pointer entered the trigger area, the first content item and the second content item, wherein the second content item includes an explanation of the current state of the field being in the read-only state or the locked state and an action to be completed by the user for switching the current state of the field to the editable state, the second content item determined based on the factor causing the current state of the field; and switching, in response to detecting completion of the action, the current state from the read-only state or the locked state to the editable state.

7. A system as in claim 6, wherein the determining the current state occurs dynamically at run time upon the detecting that the pointer entered the trigger area.

8. A system as in claim 6, wherein the text explanation is based on stored state-specific mouse-over guidance content including a default mouse-over guidance content item for the field.

9. A system as in claim 6, wherein the database structure associated with the field comprises a business object, and wherein the first content item applies to an extension field added to the business object.

10. A computer-implemented method comprising:

determining a current state of a field in a user interface of a software application program, the current state comprising at least one of an editable state, a read-only state, and a locked state of the field in the user interface;

identifying a factor causing the current state of the field, wherein the factor comprises a condition associated with a database structure, the condition being based on a time period during which data can be added, changed, deleted, and/or altered by a logged-in user;

retrieving, from the metadata repository and in response to determining the current state of the field is the read-only state or the locked state, the first content item and a second content item;

detecting whether a pointer has entered a trigger area associated with the field, the trigger area separate from the field;

displaying, when the current state is the editable state and in response to detecting that the pointer entered the trigger area, the first content item, wherein the first content item includes a text explanation of data which may be entered into the field;

displaying, when the current state is the read-only state or the locked state and in response to detecting that the pointer entered the trigger area, the first content item and the second content item, wherein the second content item includes an explanation of the current state of the field being in the read-only state or the locked state and an action to be completed by the user for switching the current state of the field to the editable state, the second content item determined based on the factor causing the current state of the field; and switching, in response to detecting completion of the action, the current state from the read-only state or the locked state to the editable state.

11. A computer-implemented method as in claim 10, wherein the determining the current state occurs dynamically at run time upon the detecting that the pointer entered the trigger area.

12. A computer-implemented method as in claim 10, wherein the text explanation is based on stored state-specific mouse-over guidance content including a default mouse-over guidance content item for the field.

13. A computer-implemented method as in claim 10, wherein the database structure associated with the field comprises a business object, and wherein the first content item applies to an extension field added to the business object.

14. A computer-implemented method as in claim 10, wherein at least one of the determining, the identifying, the retrieving, the detecting, the displaying, and the switching is performed by a system comprising at least one programmable processor.

* * * * *